United States Patent [19]

Schaff et al.

[11] Patent Number: 4,989,086
[45] Date of Patent: Jan. 29, 1991

[54] ULTRA WIDE FIELD-OF-REGARD MULTISPECTRAL IMAGING RADIOMETER

[75] Inventors: Fred L. Schaff, Ellicott City; Leslie L. Thompson, Bowie, both of Md.

[73] Assignee: Westinghouse Electric Corp., Pittsburgh, Pa.

[21] Appl. No.: 250,655

[22] Filed: Sep. 29, 1988

Related U.S. Application Data

[63] Continuation-in-part of Ser. No. 201,222, Jun. 2, 1988, abandoned.

[51] Int. Cl.$^5$ .............................................. H04N 7/18
[52] U.S. Cl. ................................ 358/109; 358/213.26; 250/334
[58] Field of Search ................ 358/109, 113, 110, 206, 358/199, 213.26; 354/95; 250/332, 334

[56] References Cited

U.S. PATENT DOCUMENTS

| | | |
|---|---|---|
| 2,949,055 | 8/1960 | Blackstone . |
| 3,294,903 | 12/1966 | Goldmark et al. .................. 358/109 |
| 3,580,150 | 5/1971 | Watson et al. . |
| 3,864,513 | 2/1975 | Halajian . |
| 4,004,086 | 1/1977 | Buss . |
| 4,264,921 | 4/1981 | Pennington et al. . |
| 4,280,147 | 7/1981 | McCann et al. ................. 358/109 X |
| 4,477,829 | 10/1984 | Ziman et al. ..................... 358/109 X |
| 4,560,869 | 12/1985 | Hien et al. . |
| 4,639,774 | 1/1987 | Fried ................................. 358/109 X |
| 4,695,964 | 9/1987 | Sato et al. ........................ 358/109 X |

FOREIGN PATENT DOCUMENTS

| | | |
|---|---|---|
| 57-143683 | 9/1982 | Japan . |
| 58-108514 | 6/1983 | Japan . |
| 58-165478 | 9/1983 | Japan . |
| 60-120657 | 6/1985 | Japan . |
| 60-123158 | 7/1985 | Japan . |

*Primary Examiner*—Howard V. Britton
*Assistant Examiner*—Victor R. Kostak
*Attorney, Agent, or Firm*—W. G. Sutcliff

[57] ABSTRACT

An imaging radiometer for scanning an area of interest from a platform moving in an orbital trajectory comprises at least one moving scanning mirror directed toward the area of interest. The mirror produces a changing scan area image representing a portion of the area of interest within the scan area of the mirror. A fixed optical viewer is mounted on the platform for viewing the scan area image and directing the image along its optical path. A detector in the optical path receives the changing scan area image over a selected time interval and periodically produces an electrical output, each output representing a different scan area image of the mirror over each time interval. In one embodiment the detector has a plurality of areas of different spectral response. Image motion compensation, electronically controlled light intensity gain and electronically controlled image size correction are incorporated in the apparatus.

14 Claims, 4 Drawing Sheets

ULTRA WIDE FIELD-OF-REGARD MULTISPECTRAL IMAGING RADIOMETER

CROSS-REFERENCE TO RELATED APPLICATION

This application is a continuation-in-part of copending U.S. patent application Ser. No. 07/201,222, filed June 2, 1988, now abandoned.

BACKGROUND OF THE INVENTION

The invention is directed to an imaging device for use in a moving platform. In particular, the invention concerns a multispectral imaging radiometer adapted to be carried on a platform that is airborne or in earth orbit for scanning the surface and atmosphere of the earth. It should be understood and appreciated by those skilled in the art that, while the invention is described with respect to use in connection with earth oriented applications, it may be readily used in remote scanning applications of other planets or objects. Reference to the earth orbit is for convenience in explaining the invention and should not be considered a limitation of the invention.

Imaging of the earth and the earth's atmosphere from a moving platform with an electro-optical sensor has been a mission of numerous aircraft and space programs. Many technical concepts have been devised for imaging the earth's surface from the full frame "snapshot", such as provided by film cameras, to the "pushbroom" sensor concept. The former has practically disappeared from use except for an occasional special purpose photograph. The latter requires very large field-of-view optical systems and detector arrays with many thousands of elements. An intermediate mode of operation, sometimes called "whiskbroom", is a system that uses one-dimensional mechanical scanning across the direction of motion of the platform. Contiguous coverage of the earth in the platform direction of the scanner's field-of-view is achieved when the scanner rate is matched to a composite of the cross-track field-of-regard, the in-track field-of-view and the in-track velocity.

Many radiometers, regardless of type, operate in only one or two spectral bands. Applications exist that require as many as ten spectral bands. The bands must be spatially and temporally registered with each other. Also, such applications require improved sensitivity. Conventional scanning radiometers may cause image rotation which prevents the use of detector arrays in the focal plane and makes multispectral detection difficult if not impractical.

SUMMARY OF THE INVENTION

The invention comprises an imaging radiometer for scanning an area of interest from a platform moving in an orbital trajectory. The area of interest is defined by a field-of-regard across the track of the orbital trajectory and a field-of-view in the track of the orbital trajectory. At least one scanning mirror has a viewing area directed toward the area of interest. The mirror is movably mounted in the platform about at least one axis, oriented in the track of the orbital trajectory, for scanning the field-of-regard across the track of the platform. The motion of the mirror produces a changing scan area image, representing a portion of the area of interest within the field-of-regard and the field-of-view. A driver moves the mirror at a near-contant rate between the extreme ends of the area of interest. A fixed image forming means is mounted on the platform for viewing the scan area image. A detector is mounted in the optical path of the image forming means for receiving the changing scan area image therein over a selected time interval and periodically producing an electrical output, each output representing a different scan area of the mirror over each time interval. In one embodiment of the invention, the detector has a plurality of areas of different spectral response. Each area is aligned for viewing the same field-of-view over the field-of-regard at different wavelengths in temporal and spatial registration with each other.

DETAILED DESCRIPTION OF THE PREFERRED EMBODIMENT

Figure 1:
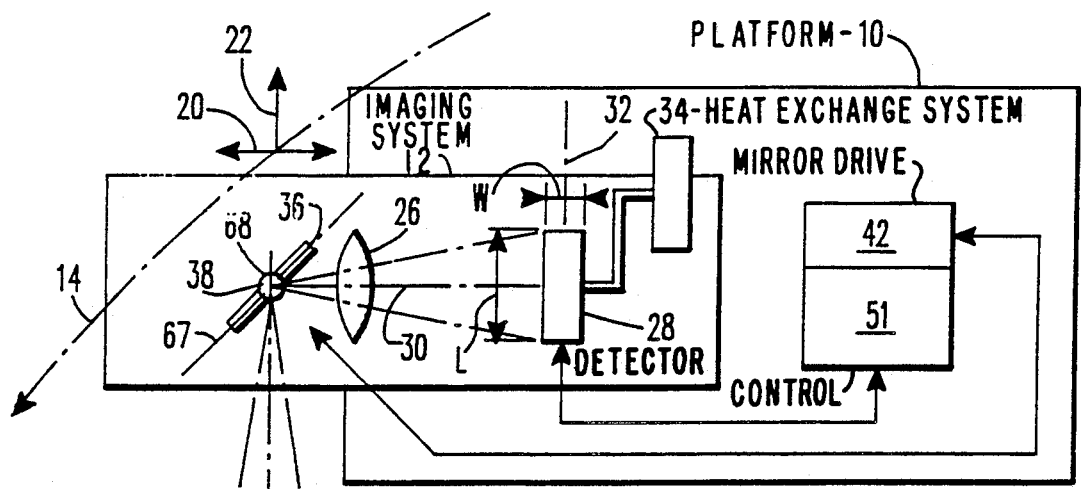
FIG. 1 is a schematic illustration of an imaging radiometer of the present invention mounted on a platform in earth orbit.
Figure 1:
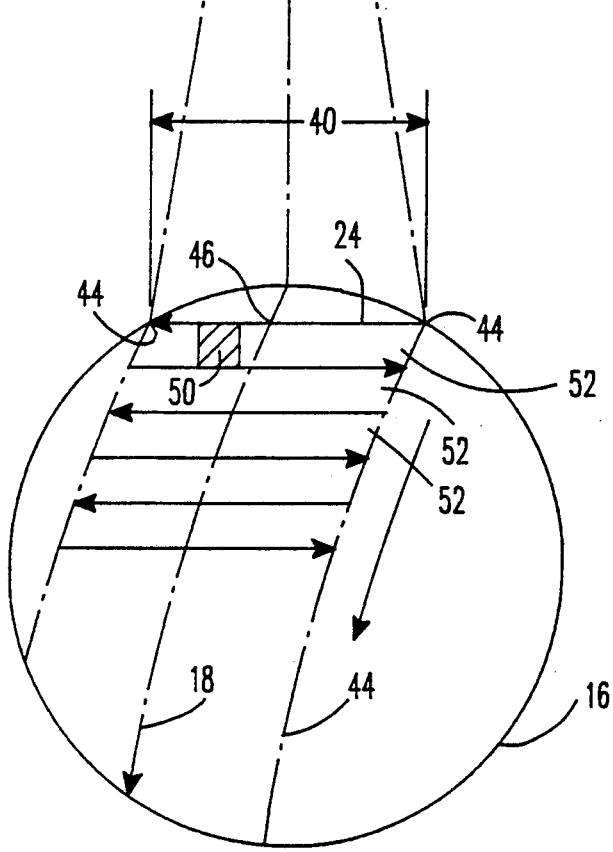

An imaging apparatus according to the present invention is illustrated in FIG. 1. A platform 10 carries an image forming means or imaging system 12 such as a radiometer in fixed relation therewith. The platform 10 moves in an orbital trajectory 14 with respect to the earth 16. The direction of the orbital trajectory 14 is referred to as the in-track direction. The projection 18 of the orbital trajectory 14 on the surface of the earth 16 is referred to as the earth in-track direction. The direction 20 transverse to the orbital trajectory 14 is referred to as the cross-track direction. The radial direction 22 at the zenith is orthogonal with the respective in-track and the cross-track directions 14 and 20. The projection of the cross-track 20 on the earth 16 is illustrated by the earth cross-track 24.

The platform 10 moves along the trajectory 14. The imaging system 12 is secured to the platform 10 and moves with it in fixed relationship. The imaging system 12, shown schematically, may be a telescope including a lens system 26 and a solid state detector 28. In one embodiment the detector 28 is a charge coupled device, the configuration of which is hereinafter described. The detector 28 is located in the optical path 30 of the imaging system 12 and lies in the focal plane 32 of the lens 26. The detector 28 is likewise located in fixed relationship with respect to the platform 10. A cryogenic heat exchange system 34 may be provided to cool the detector 28, especially in the infrared region of the spectrum.

A scanning mirror 36 is located in the optical path 30 of the imaging system 12. The mirror 36 oscillates about a mirror axis 38. The mirror 36 scans a field-of-regard 40 across the earth 16 in the cross-track direction 20. A mirror drive 42 is operatively coupled to the mirror 36 for driving it at near-constant rates between the opposite extreme ends 44 of the field-of-regard 40. The field-of-view 46 of the imaging system 12 is defined by the projection of the width W of the detector 28 onto the surface of the earth 16 in the in-track direction 14. The area of the detector 28 projected onto the surface of the earth 16 is the footprint 50. As the mirror 36 scans in the cross-track direction 20, the footprint 50 moves in the earth cross-track direction 24 across the field-of-regard 40. Thus, the field-of-view is scanned through the field-of-regard 40 thereby creating a band 52.

A control 51 on the platform 10 performs a variety of control functions. The control 51 provides signals to operate the motor drive 42 which operate the mirror 36. The control 51 is also coupled to the detector 28 for controlling the image sensing properties of the detector 28 as a function of the position of the mirror 36.

Figure 2:
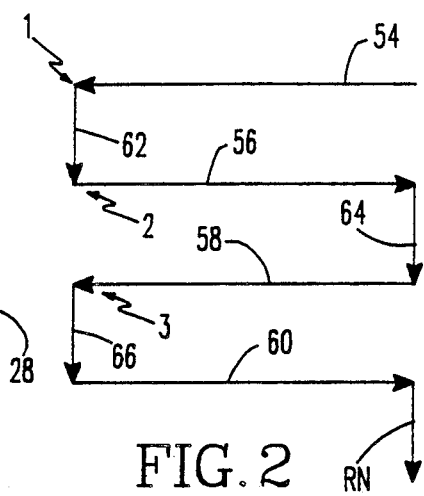
FIG. 2 is an illustration of the scan configuration of the mirror illustrated in FIG. 1.

The scan configuration is illustrated in FIG. 2 by the interconnected arrows 54–66. The first scan 54 occurs in the cross-track direction 20 by motion of the mirror 36 about the mirror axis 38. The mirror 36 oscillates back and forth at a near constant rate to produce scans 54, 56, 58, 60. The scans 54–60 are parallel to the cross-track direction 20. The second or reset scans 62, 64, 66 occur in the in-track direction 18. This is accomplished by an additional optical means (not shown) that has the same effect as rotating mirror 36 about a second axis 67, orthogonal to mirror axis 38 and lying in the plane of mirror 38 and the plane of the page. Rotation of the mirror 36 about the axis 67 is sufficient to compensate for the forward motion of the platform 10. The effective rotation of mirror axis is an angle 68 which is determined nominally by the distance travelled in the in-track direction 14, i.e., the platform velocity v times the time T for one scan across the field-of-regard 40, divided by the altitude 41 in accordance with the following expression.

Mirror axis angle 68 = arc-tan vT/altitude 41.

The mirror 36 is reset about this second axis 67 at the end of each respective scan 54–60, during reset intervals 62, 64, 66. Alternatively, a second scanning mirror (not shown) may be provided in the optical path 30 to establish the desired motion compensation.

In accordance with the embodiment of the invention illustrated in FIG. 1, the footprint 50 moves in the earth cross-track direction 24 and in the earth in-track direction 18, in such a way that each band 52 seen by the detector 28 is contiguous with the next adjacent band 52. The bands 52 are contiguous in the in-track direction 18 and parallel with each other and in the cross-track direction 24. Thus, no earth area is missed and no unnecessary overlap in the scan occurs.

Figure 1A:
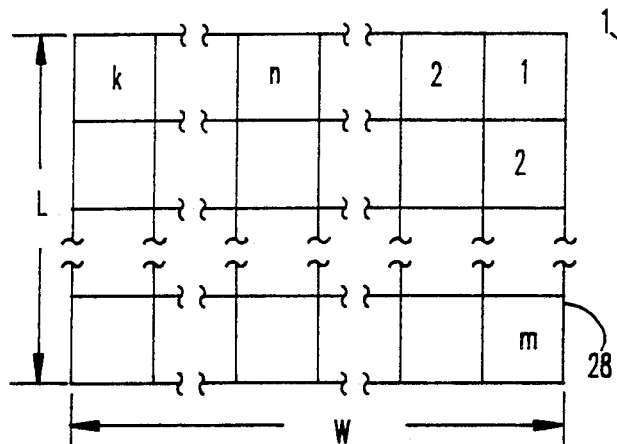
FIG. 1A is a schematic illustration of a monolithic charge coupled device having an array of n×m sensitive elements.
Figure 3:
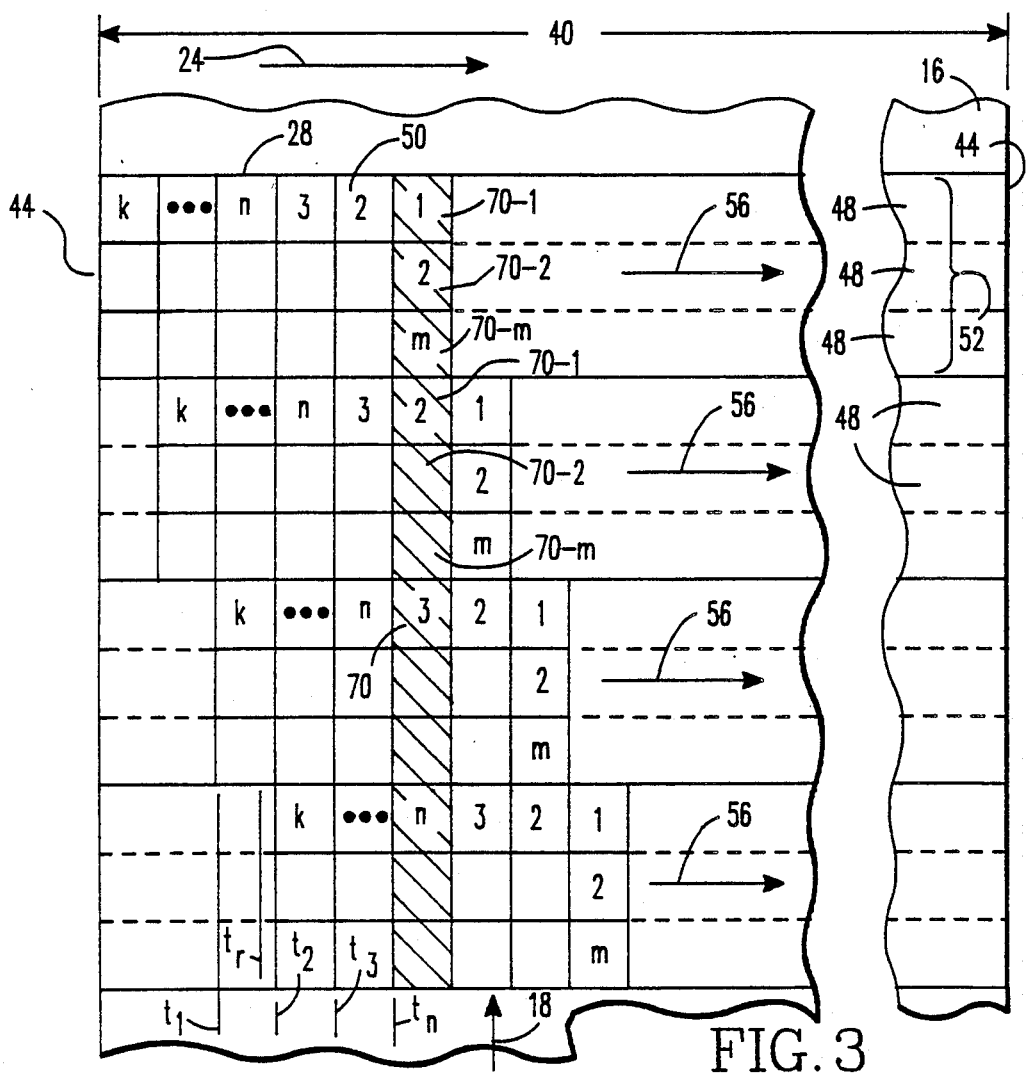
FIG. 3 is a schematic illustration of the footprint of an n×m element detector on the earth's surface, illustrating a time delay and integration technique performed in accordance with the present invention.

In one embodiment of the invention, shown in FIG. 1A, the detector 28 is a multi-element charge coupled device, typically an n×m array, having a finite length L and width W. The projection of the detector 28 onto the earth 16 results in a footprint 50 using a subset of n×m elements from 1×1 to n×m as a function of the cross track direction 24, as illustrated in FIG. 3. In the in-track direction 18 the footprint 50 subtends the band 52 such that 1 to m scan lines 48 are incorporated in the band 52. As the mirror 36 oscillates about mirror axis 38, the footprint 50 moves between the extremes 44 of the field-of-regard 40. At any given instant, the footprint 50 covers a different area of the earth's surface.

The scan configuration illustrated in FIG. 3 allows implementation of desired features of the invention. One feature, referred to above, is the ability to scan in both directions across the field-of-regard 40 for viewing contiguous bands 52 without re-scanning parts of previously scanned bands, a condition known as overlap. The scan configuration of the invention also allows for the implementation of a time delay and integration feature whereby the resolution or sensitivity is improved.

FIG. 3 shows four successive instants of time $t_1 - t_n$ for each of the strips 48 which are subdivisions of the same band 52 and same scan direction, such as the scan direction 56 in FIG. 2. At time $t = t_1$, element 1 of detector 28 sees an area or pixel 70-1 comprising a portion of the footprint 50. In scenarios encountered by the imaging radiometer the altitude 41 may change as a function of field-of-regard 40, and the scene intensity may change as a function of environmental conditions. Compensation or normalization of conditions are derived within the invention by varying the subset of n×m elements from 1×1 to n×m to compose the locally correct footprints 50, and by varying the subset of 1 to k elements to correct for local intensity values where k is never less than n. For a brief read interval $t_r$ prior to $t_2$, the information in pixel 70-1 sensed in element 1 is read out to a register or other storage device (not shown in FIG. 3). During the next time interval $t_3 - t_2$ (minus the next read interval $t_r$) the element 2 sees pixel 70-1 and adds this signal to the stored signal for element 1. This occurs n times for the 1 through n elements of detector 28 in each row 1-m and the results are summed for each pixel. Thus, each detector element 1 through n sees and records each pixel 70-1 in scan line 48.

According to the invention, the time delay and integration technique involves allowing the detector elements 1 through n in row 1 to see a given ground area or pixel 70-1 resulting in a total signal n times greater than a single detector. As the mirror 36 (FIG. 1) scans through the field-of-regard 40, the 1-k elements of the first row of the detector 28 are exposed to pixel 70-1 in the scan line 48 and provide a signal that is enhanced in amplitude due to the time delay and integration operation. Similarly, the n elements in rows 2-m view the pixels 70-2 through 70-m in their corresponding scan lines 48, so that the entire band 52 is scanned. As a function of field-of-regard 40 and local intensity, a footprint 50 may as determined by control 51, consist of from 1×1 to m×k elements sampled in groups from 1×1 to m×n sets.

Figure 4:
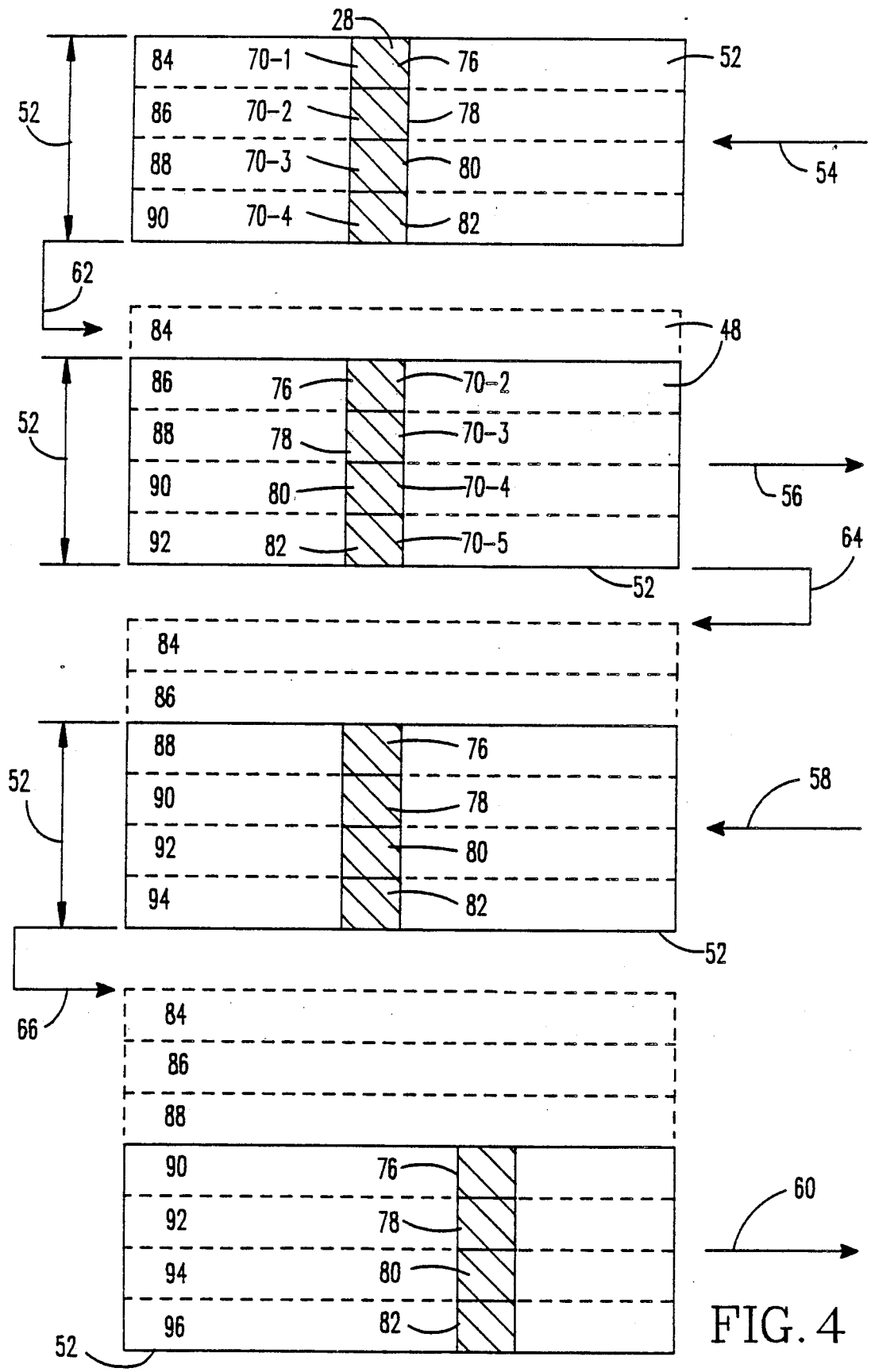
FIG. 4 is an illustration of the footprint of a multispectral k element detector incorporating a contiguous scan technique.

FIG. 4 illustrates an arrangement where the detector 28 has many separate multi-element areas 76–82, each respective area being responsive to a different spectral wavelength of energy. In this arrangement, each band 52 is subdivided into strips 48, as previously described. However, during particular scans 54–60, strips 48 are also referred to by reference numerals 84–96. A particular strip 48 is limited to a portion of the band 52 of the earth's surface observed by a given detector/spectral filter combination. During scan 54, each detector area 76–82 sees a respective strip 84–90 on the surface of the earth in its particular field-of-view. For example, during scan 54, element area 82 sees strip 90. As further explained below, during scan 56, element area 82 sees strip 92, and element area 80 sees strip 90 at its corresponding wavelength. Thus, for each cycle of scans 54-58, each detector area 76-82 sees each strip 84-90 in each different wavelength, whereby multispectral scanning is accomplished. In FIG. 4, the strips 84-90 are contiguous and each detector area 76-82 sees the particular band 84-90 in its particular field-of-view.

Detector areas 76-82, each responsive to a different spectral wavelength, scan geometrically contiguous strips 84-90 in each band 52. During scan 54, detector areas 76-82 scan strips 84-90 respectively. Thus, in scan 54, all the pixels 70-1 in strip 84 are observed in the wavelength associated with detector area 76. All the pixels 70-2 in strip 86 are observed in the different wavelength associated with detector 78. Likewise, the remaining detector areas 80 and 82 observe pixels 70-3 and 70-4 in the respective strips 88 and 90. At the end of scan 52, the scan motion reverses and indexes at 62 in such a manner that the next scan 56 is advanced geometrically on the earth's surface by the width of one strip 48 of band 52. Detector area 76 now observes the pixels 70-2 of strip 86, and similarly, detector areas 78-82 observe strips 88-92. Repeating this scan reversal and index by one strip 48, twice more, it can be seen that each detector area 76-82 sees each corresponding strip 84-90 in every spectral wavelength. This occurs for all strips 48 in each band 52, after an appropriate number of scan cycles. Thus, multispectral data is provided.

Detector 28 may be a single integrated device as shown, having a plurality of areas 76-82, each having means to provide an overlying film (not shown) for filtering different wavelengths. An alternate detector 28 configuration may be formed of separate discrete devices, each responsive to a different wavelength by means of optical filters or directly deposited films (not shown).

The motion compensated scan shown in FIG. 2 allows for time delay and integration viewing of each band 52 across the field-of-regard 40 as illustrated in FIG. 3. The scanning configuration also allows for viewing contiguous bands 84-90 in different spectra as illustrated in FIG. 4.

Figure 5:
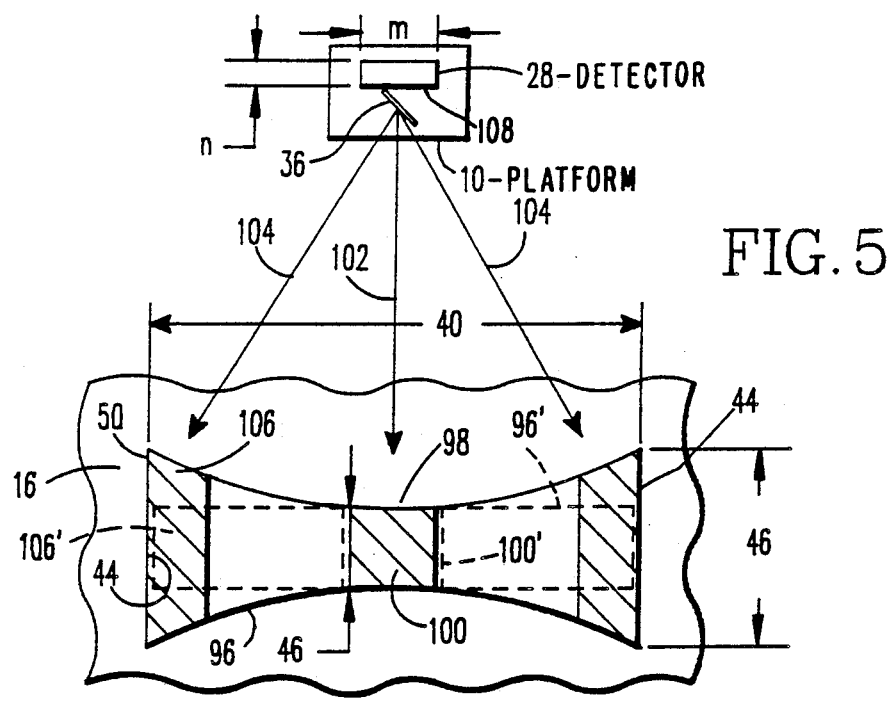
FIG. 5 is a schematic illustration, in projection, of one band on the surface of the earth across the field-of-regard with a modified detector projection superimposed thereon, and with the radiometer of the invention shown schematically in side view.

FIG. 5 illustrates schematically, in an exaggerated form, the apparent configuration of a band 96 of terrestrial surface when viewed from a high altitude and an overlying corrected band 96'. The footprint 50 of the detector 28, as it actually intersects the earth's surface, widens and falls away at the extreme ends 44 of the field-of-regard 40 as the slant range changes. When the detector 28 is looking at the nadir 98 (opposite the zenith), the footprint 50 is represented by a square area 100. At the nadir 98 the detector 28 views its footprint 50 more closely because the distance 102 of the platform 10 from the earth 16 at the nadir 98 is shorter than the distance 104 at the opposite extreme ends 44 of the field-of-regard 40. When the detector 28 views the band 96 at the extreme ends 44 of the field-of-regard 40, its footprint 50 (i.e., its projection on the earth 16) has an elongated trapezoidal shape 106 caused by the different slant range. Thus, the detector 28 sees more area at the extreme ends 44 of the field-of-view 40 than at the nadir 98. Also, the areas 106 are farther away from the detector 28 due to the curvature of the earth 16. In order to compensate for the difference in the apparent size of the footprints 100 and 106, the detector 28 is configured at the nadir 98 so that m×n of elements 28 are combined as one footprint 50. Thus, at the nadir 98, all of the n rows of detector elements 108 and all of m columns of detector elements 108 are used to generate signals (i.e., read) during selected read time intervals $t_r$, referred to in FIG. 3. At the extreme ends 44 of the field-of-regard 40, a lower number of elements 108 are read. This makes a physically smaller active detector area which, when projected on the earth, resembles the area 106'. Between the extreme ends 44 and the nadir 98, selected elements 108 in the n rows and m columns are added to the read-out so that the effective area at the earth's surface of the detector 28 is relatively uniform over the field-of-regard 40. The system thereby modifies the changing footprint 100-106 as it moves along the band 96 to a more uniform, geometrically equal footprint size 100'-106' confined to a more narrow band 96'. The modified band 96' may overlap with contiguous bands somewhat.

In order to further enhance the sensitivity of the detector 28, the mirror 36 may be driven harmonically (i.e., sinusoidally) so that it is directed at the extreme ends 44 of the field-of-regard 40 for a time relatively longer than when it is directed at the nadir 98. The harmonic motion of the mirror 36 compensates for the increased viewing distance 104 at the extremes 44 by providing nearly equal ground sample distances as a function of scan angle using equal intervals of time to read-out the detectors.

Figure 6:
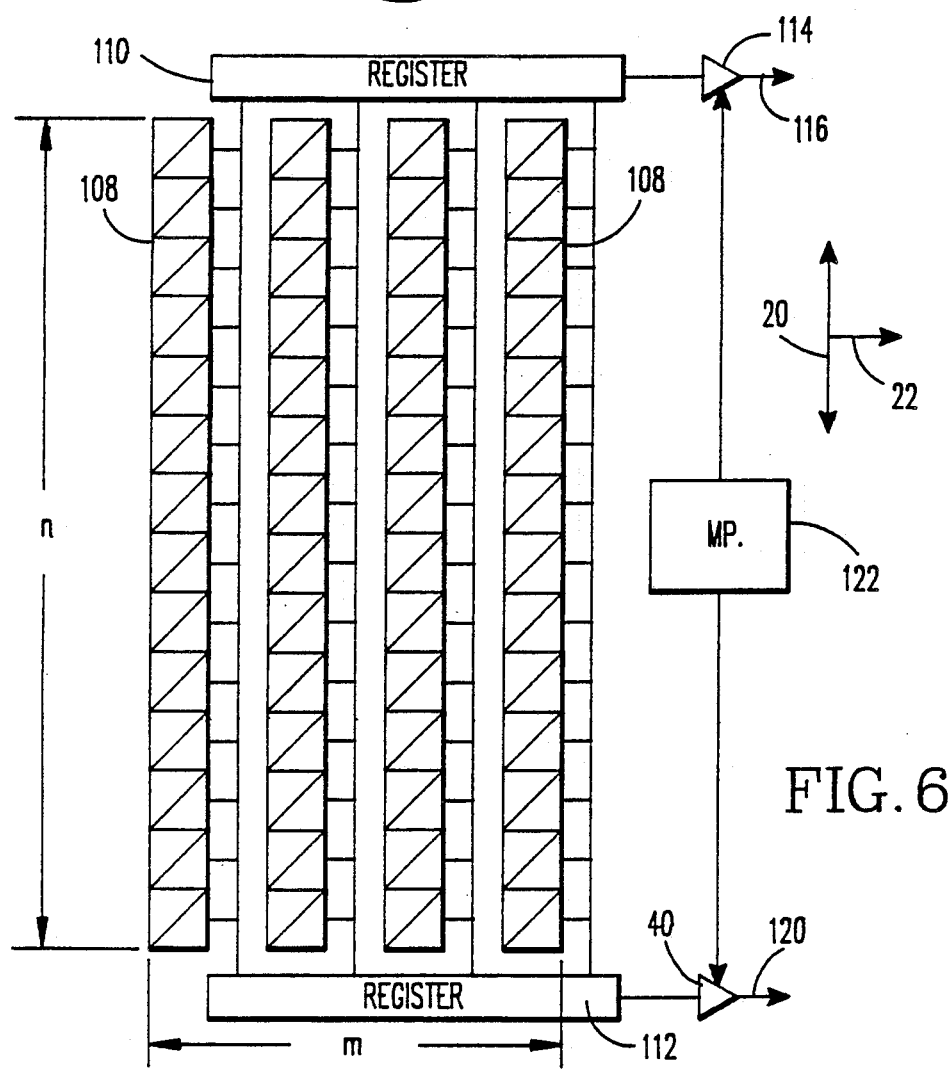
FIG. 6 is a schematic illustration of a detector having an n×m array of detector elements and a control circuit therefor.

FIG. 6 illustrates, in simplified schematic block form, a circuit for reading and integrating the n×m footprint set and m×k TDI set in detector 28. The circuit includes first and second read-out registers 110 and 112. Each register is coupled to receive an input from each of the elements 108. For each scan in the cross-track direction 20 (from top to bottom in FIG. 6), the first register 110 reads the values of each of the n×m elements 108 during each read time interval $t_r$ (FIG. 3). For each return scan (from bottom to top in FIG. 6), the second register 112 reads out the values of the n×m elements 108 during each interval $t_r$. The first register 110 is coupled to a first amplifier 114 which produces a first output 116 corresponding to the integrated output of each n×m element 108. Similarly, second register 112 is coupled to a second amplifier 118 which produces a second output 120. A programmed algorithm and electronic means or microprocessor 122 modifies the outputs 116 and 120, by selecting parts of the outputs, to compensate for the changing of the detector footprint 50 over the field-of-regard 40. The geometric correction provided by the microprocessor 122 changes across the field-of-regard 40 to a minimum at the extreme ends 44. Similarly, as the daylight conditions change, the microprocessor 122 adjusts the gain of the outputs 116 and 120, by varying the TDI value of k elements equal or greater than n contained in each footprint sample 50.

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains.

What is claim is:

1. An imaging radiometer mounted on a platform moving in a uniform trajectory in an in-track direction, said radiometer for scanning an area of interest laterally of the in-track direction in a cross-track direction, said area defined by a field-of-view dimension in the in-track direction and a field-of-regard dimension in the cross-track direction, said imaging radiometer comprising:

- at least one scanning mirror having a viewing area directed toward the area of interest, the mirror being movably mounted on the platform for scanning between extreme ends of the field-of-regard in the cross-track direction of the platform, said mirror producing an image representing a portion of the area of interest within the viewing area of the mirror;
- means for driving the mirror at near-contant rate relative to the extremes of the field-of-regard and inversely of the in-track direction of the platform, the image produced by the mirror changing with the position of the mirror relative to the portion of the area of the interest within the viewing area of the mirror;
- an image forming means mounted on the platform in fixed relation with the mirror for viewing the mirror and redirecting the changing image along an optical path; and
- multi-element detector means mounted in the optical path in fixed relationship with the image forming means for receiving the changing image thereon over a selected time interval and periodically producing an electrical output, each output representing a different image over each time interval, selected elements of the detector means being responsive to receive in successive time intervals, the same portion of the changing image.

2. The radiometer of claim 1, wherein the selected elements of the detector are aligned in a row and each of said elements is responsive to light energy from a portion of the image for producing a signal indicative thereof, and further including storage means for storing the signal of each element corresponding to a particular portion of the image and integrating means for combining the signals corresponding to the particular portion of the image so that each of said particular portions is viewed a multiplicity of times in succession over the selected time interval during a scan across the field-of-regard to increase the signal output of the detector.

3. The radiometer of claim 2, wherein the storage means includes a register having inputs coupled to selected elements for receiving the output of each element, and the integrating means includes an amplifier for reading out the register sequentially.

4. The radiometer of claim 3, further including gain control means for modifying the output of the amplifier in accordance with the relative position of the mirror with respect to the extremes of the field-of-regard and illumination conditions over the field-of-regard.

5. The radiometer of claim 4, wherein the area of interest appears distorted in accordance with changes in slant range across the field-of-regard and the gain control means for modifying the output of the amplifier in accordance with the position of the mirror relative to the field-of-regard includes an algorithm and electronic means to select the effective physical size of the detector to compensate for changing area of interest caused by changes in the slant range across the field-of-regard.

6. The radiometer of claim 1, wherein the detector comprises a discrete array of $k \times m$ discrete elements including a subset of an $n \times m$ array of discrete elements.

7. The radiometer of claim 1, wherein the detector comprises a $k \times m$ array of elements in a monolithic integrated circuit device.

8. The radiometer of claim 1, wherein the mirror scans the field-of-regard in adjacent geometrically contiguous bands.

9. The radiometer of claim 1, wherein the areas of different spectral response includes separate detection devices.

10. The radiometer of claim 1, wherein said detector means has multi-element areas of different spectral response, each area being aligned for viewing the changing image at different wavelengths in response to the elements for spatial registration within reach other.

11. The radiometer of claim 10, wherein the areas of different spectral response are integrated in one device and further includes filter means for each area in integrated overlying relation therewith.

12. The radiometer of claim 1, wherein the mirror is mounted about a mirror axis aligned with the in-track direction.

13. The radiometer of claim 12, wherein the mirror is mounted relative to the mirror axis for resetting the mirror at the extremes of the field-of-regard.

14. The radiometer of claim 1, wherein the mirror is mounted for compound motion in the direction of the field-of-regard and the direction of the field-of-view.

* * * * *